United States Patent
Woolley et al.

[19]

[11] Patent Number: 5,901,832
[45] Date of Patent: May 11, 1999

[54] APPARATUS FOR CONVEYING BAGS

[75] Inventors: William J. Woolley, Chicago; Steven A. Karnatz, Wauconda, both of Ill.

[73] Assignee: Weiler Engineering, Inc., Arlington Heights, Ill.

[21] Appl. No.: 08/785,332

[22] Filed: Jan. 21, 1997

[51] Int. Cl.⁶ .................................................. B65G 15/14
[52] U.S. Cl. .................................. 198/626.3; 198/626.5; 198/345.2; 53/249; 53/570
[58] Field of Search .............................. 198/626.5, 626.3, 198/345.1, 345.2, 463.1; 53/562, 570, 249, 257

[56] References Cited

U.S. PATENT DOCUMENTS

| | | | |
|---|---|---|---|
| 3,315,786 | 4/1967 | Hazelton | 198/626.5 |
| 3,545,171 | 12/1970 | Salomon | 53/562 |
| 3,650,527 | 3/1972 | Helm . | |
| 3,727,372 | 4/1973 | Roberts . | |
| 4,230,218 | 10/1980 | Kunzmann | 198/626.5 |
| 4,546,526 | 10/1985 | Dusel et al. | 198/626.5 |
| 5,094,443 | 3/1992 | Young, Jr. | 198/626.3 |
| 5,115,619 | 5/1992 | Lieder | 53/570 |
| 5,134,833 | 8/1992 | Lerner et al. . | |
| 5,170,880 | 12/1992 | Low | 198/626.5 |
| 5,244,196 | 9/1993 | Walter et al. | 198/626.5 |
| 5,279,095 | 1/1994 | Muller | 198/626.5 |
| 5,435,433 | 7/1995 | Jordan et al. | 198/626.3 |
| 5,755,073 | 5/1998 | Moncreif et al. | 198/626.5 |

FOREIGN PATENT DOCUMENTS

| | | | |
|---|---|---|---|
| 315-581 | 5/1989 | European Pat. Off. | 198/626.3 |
| 4-55206 | 2/1992 | Japan | 198/626.3 |

*Primary Examiner*—William E. Terrell
*Assistant Examiner*—Douglas Hess
*Attorney, Agent, or Firm*—Olson & Hierl, LTD.

[57] ABSTRACT

An apparatus for conveying bags along a path which includes a plurality of work stations. The conveyor apparatus includes a plurality of conveyor assemblies. Each of the conveyor assemblies includes opposed belt assemblies, one of which is laterally displaceable. Opposed belts of the opposed belt assemblies are contiguous for grasping the sides of the bags and transporting the bags in a generally upright orientation as the belts are driven in synchronism.

14 Claims, 6 Drawing Sheets

APPARATUS FOR CONVEYING BAGS

TECHNICAL FIELD OF THE INVENTION

This invention relates to a conveyor apparatus and, more particularly, to an apparatus for transporting parenteral infusion bags along a predetermined paths.

BACKGROUND OF THE INVENTION

In machines such as those for packaging parenteral infusion bags, the bags are fed into and moved through a series of work stations by a single conveyor which extends through the machine along a bag transport path. The packaging machine is cycled such that the conveyor is intermittently arrested at selected stations so as to allow, for example, the simultaneous filling of one series of bags at one station and the sealing of another series of bags at an adjacent station. The conveyor is then advanced and the filling and sealing process is repeated on other bags on the conveyor.

The use of a single conveyor extending the length of the packaging machine has a drawback in that it requires the operations at the various stations such as filling and sealing of the bags to occur simultaneously. As a result, the packaging machine can cycle no faster than the time required to effect the slowest operation such as filling or sealing, thus adversely affecting the production rate and efficiency of the packaging machine.

What is needed is a conveying apparatus which does not require the operations at the various stations to occur simultaneously so as to increase the production rate and efficiency of the machine.

SUMMARY OF THE INVENTION

The present invention provides an apparatus for conveying substantially flat bags along a predetermined path that includes a plurality of work stations. The operations performed on the bags at selected stations, such as filling and sealing can occur independently of one another so as to increase the production rate and efficiency of the packaging machine.

The conveying apparatus includes a stationary endless belt which is rotatable in a substantially horizontal plane and which coacts with a laterally reciprocable endless belt normally contiguous to the stationary belt. These contiguous endless belts are rotatable in synchronism by servo motors or like expedients. The endless belts are adapted for grasping flat bags therebetween and for conveying the grasped flat bags in the direction of belt rotation. When the reciprocable endless belt is laterally displaced from the stationary endless belt, the bags held therebetween are released.

The conveyor apparatus includes a stationary belt assembly and an opposed laterally displaceable belt assembly. Each of the belt assemblies includes a generally horizontal frame, a drive gear at one end of the frame and idler gears at the other end of the frame. The endless belts surround the frame of the respective belt assemblies and engage the respective gears for rotation about an axis generally normal to the respective frame. Each of the belts includes a backing member which engages the gears and a generally soft face member. Opposed belts are positioned contiguous to one another and aligned for grasping and transporting the bags in a generally upright orientation along a path through work stations as the opposed belts are driven in synchronism by servo motors or the like.

Two reciprocating arm assemblies are associated with the conveyor apparatus. Each arm assembly includes a rail extending generally perpendicularly to the respective belt assembly and an arm parallel to and slidably mounted to the rail. The arm is reciprocable between a retracted bag grasping position where the belts of the opposed belt assemblies are generally contiguously disposed for conveying the bags through the machine and an extended bag release position where the belt assemblies are separated from one another to release the bags at selected work stations.

Where a packaging machine includes two or more stations, the conveyor apparatus includes two or more aligned conveyor assemblies, each including opposed first and second belt assemblies. In operation, bags are conveyed generally horizontally and in a generally upright configuration by the first conveyor assembly into and through the first station, e.g., a filling station. In particular, sides of the bags are grasped by the opposed belts of the first conveyor assembly. Soft material composition of the belt face members allows the opposing belts to firmly grip the bags.

From the first station, the bags are transferred from the first conveyor assembly to the belts of a second conveyor assembly for moving the bags into and through a second station, such as a bag sealing station.

A staggered relationship between the conveyor assemblies provides for a continuous contiguous relationship between opposed belts of successive conveyor assemblies to assure that the bags remain in contact with one or more of the belts as the bags are transferred from one conveyor assembly to another. The opposed belts of the second conveyor assembly are positioned in an adjacent and generally contiguous relationship such that the bags are grasped and conveyed through the second work station.

Additional conveyor assemblies can be added to the conveyor apparatus where the apparatus is used in a packaging machine of more than two stations.

The conveyor apparatus of the present invention advantageously allows the operations at the various stations, such as filling and sealing of the bags, to occur independently of one another. For example, where filling the bags requires more time than sealing the bags, the bags can advantageously be conveyed out of the sealing station and out of the machine while the bags in the filling station are still being filled.

As a result, and unlike present conveyor assemblies, a packaging system utilizing the present invention can cycle faster than the time required to effect the slowest operation, thus increasing the overall production rate and efficiency.

Other features and advantages of the present invention will become readily apparent from the following detailed description, the appended drawings, and the accompanying claims.

DESCRIPTION OF THE PREFERRED EMBODIMENTS

The invention disclosed herein is, of course, susceptible of embodiment in many different forms. Shown in the drawings and described hereinbelow in detail are preferred embodiments of the invention. It is to be understood, however, that the present disclosure is an exemplification of the principles of the invention and does not limit the invention to the illustrated embodiments For ease of description, a conveyor apparatus embodying the present invention is described hereinbelow in its usual horizontal operating position as shown in the accompanying drawings and terms such as upper, lower, vertical, etc., will be used herein with reference to this usual position.

Figure 1:
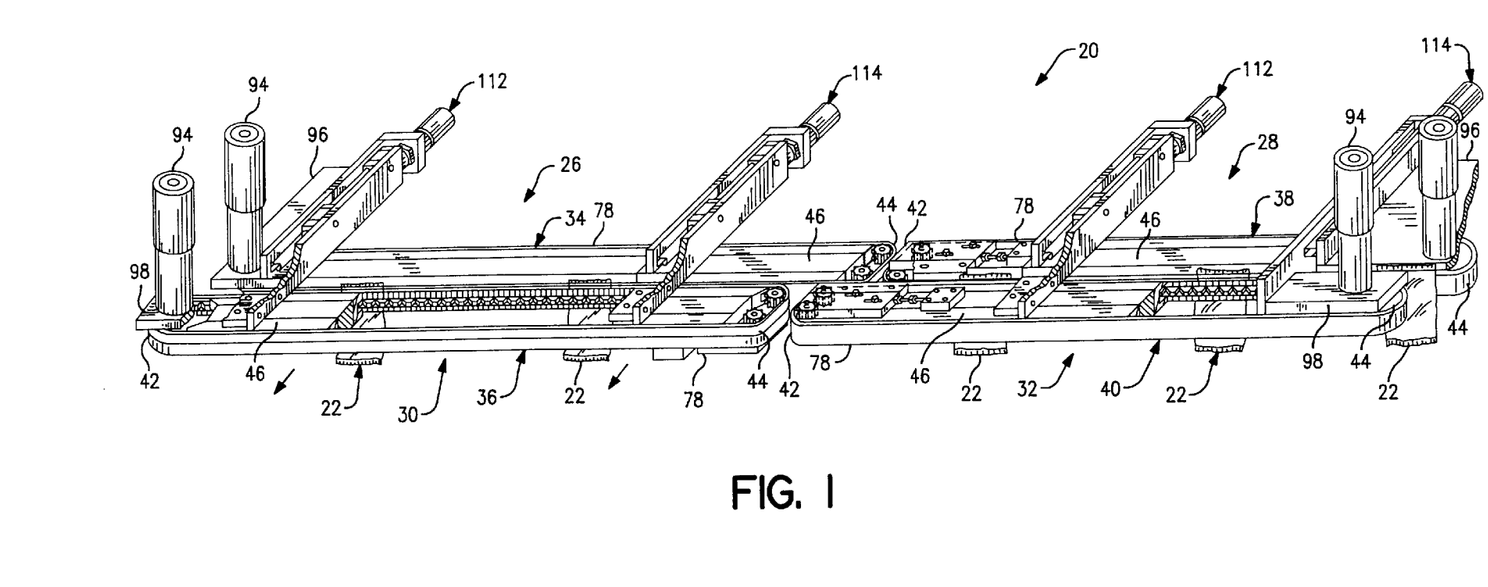
FIG. 1 is a partially broken perspective view of a conveyor apparatus embodying the principles of the present invention.
Figure 2:
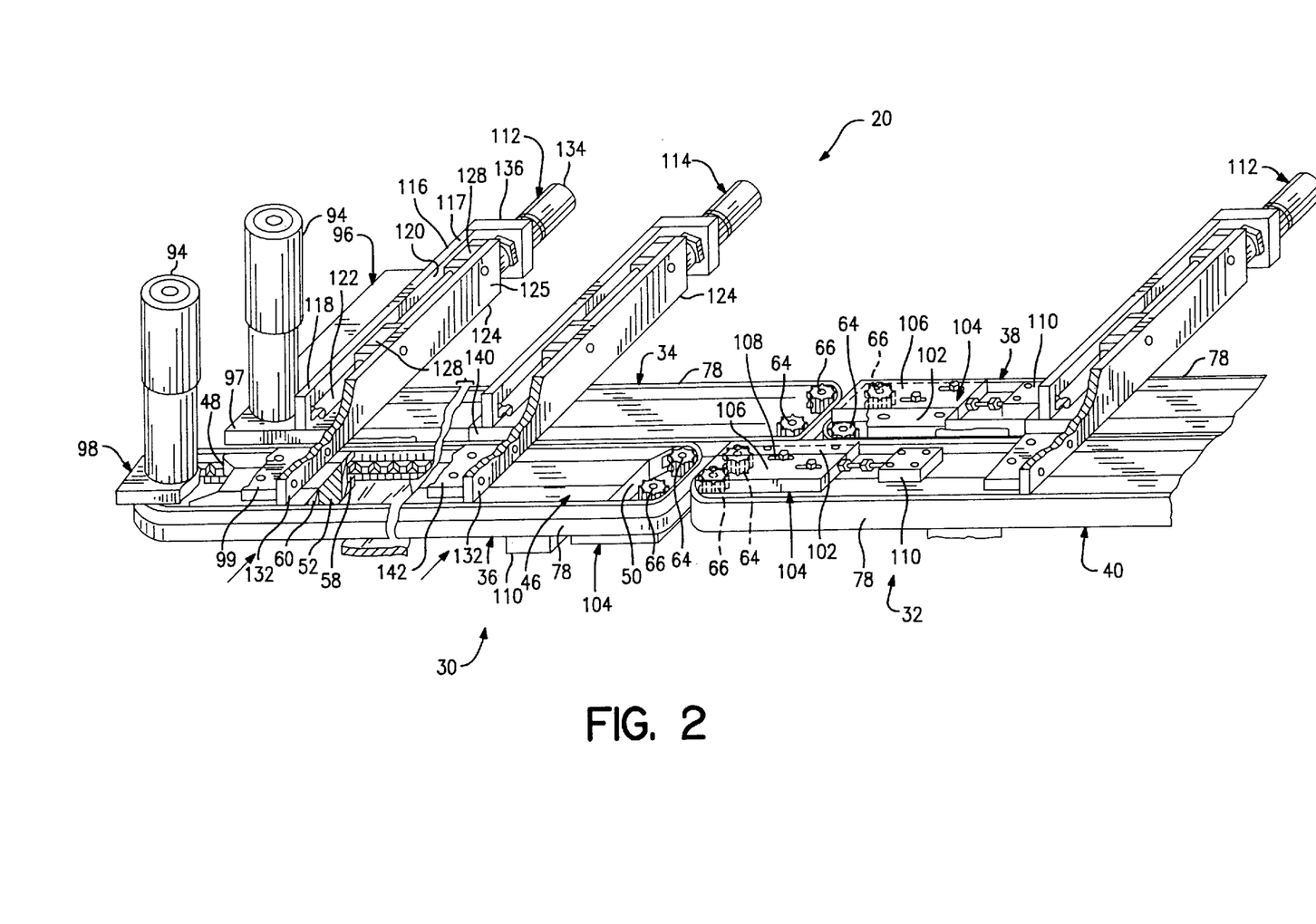
FIG. 2 is an enlarged, partially broken, perspective view of selected portions of the conveyor apparatus of FIG. 1.
Figure 3:
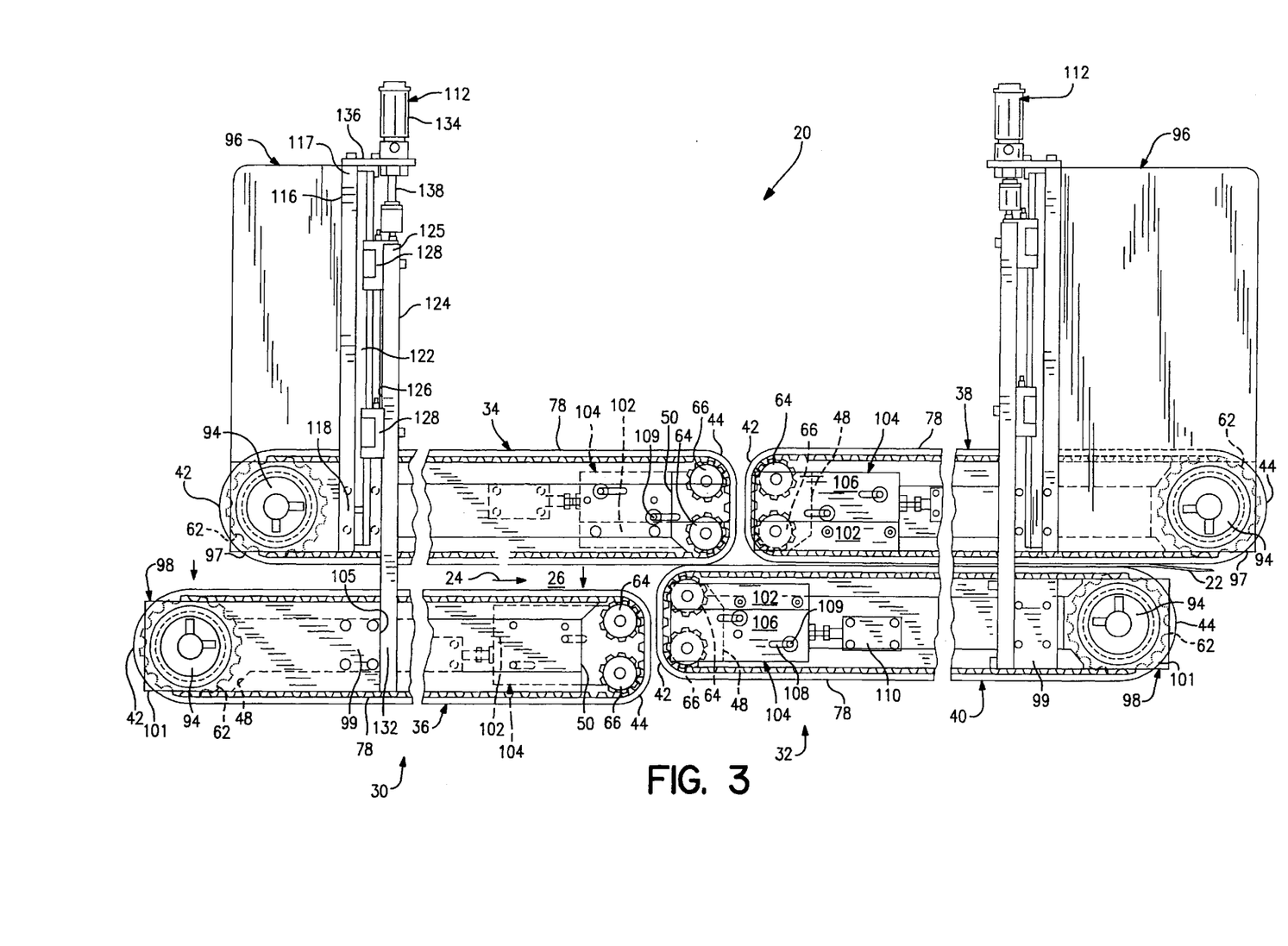
FIG. 3 is an enlarged, partially broken, plan view of selected portions of the conveyor apparatus of FIG. 1.

Referring now to the drawings, and more particularly, to FIGS. 1, 2 and 3, there is shown therein a conveying apparatus 20 for transporting parenteral infusion bags 22 generally horizontally and in an upright configuration along a work transport path 24 (FIG. 3) which includes a first station 26 where a first operation, such as filling the bags, is performed, and a second station 28 where a second operations, such as sealing the filled bags, is performed.

The apparatus 20 comprises a first belt conveyor assembly 30 positioned generally horizontally along the bag transport path 24 and extending through the first station 26. A second belt conveyor assembly 32 is positioned generally horizontally along the bag transport path 24 adjacent the first belt conveyor assembly 30 and extends through the second station 28. The first belt conveyor assembly 30 includes opposed, parallel and co-planar elongate endless belt assemblies 34 and 36 which, in FIG. 1, are shown laterally reciprocated from each other. The second belt conveyor assembly 32 includes opposed, parallel and co-planar elongate endless belt assemblies 38 and 40, which, in FIG. 1, are shown in a contiguous or abutting relationship. Each of the belt assemblies 34, 36, 38 and 40 includes opposite ends 42 and 44 (FIG. 3). Belt assemblies 34 and 38 are stationary, while belt assemblies 36 and 40 are laterally reciprocable.

The first and second belt conveyor assemblies 30 and 32 are positioned adjacent each other such that the belt assembly 34 of first conveyor assembly 30 is aligned generally co-linearly and co-planarly with the belt assembly 38 of second conveyor assembly 32 with the end 44 of belt assembly 34 juxtaposed to the end 42 of belt assembly 38. Similarly, the belt assembly 36 of first conveyor assembly 32 is aligned generally and co-planarly with the belt assembly 40 of second conveyor assembly 32 with the end 44 of belt assembly 36 juxtaposed to the end 42 of belt assembly 40. Although not shown in FIG. 1, it is understood that the belt assemblies 36 and 40 are aligned generally co-linearly when the belt assembly 36 is retracted back into abutting relationship with the belt assembly 34.

In the preferred embodiment of FIGS. 1 and 3, the belt assemblies 34 and 36 of first conveyor assembly 30 and the belt assemblies 38 and 40 of second conveyor assembly 32 are positioned with respect to each other in an offset or staggered relationship such that the end 44 of belt assembly 34 overlies and overlaps the juxtaposed ends 44 and 42 of the belt assemblies 36 and 40 respectively. In this relationship, and as shown in FIG. 2, the belt 78 of belt assembly 34 is contiguous with both the belt 78 of opposed belt assembly 36 and the belt 78 of belt assembly 40 when the belt assemblies are disposed in generally abutting relationship.

Each of the belt assemblies 34, 36, 38 and 40 includes an elongate, generally flat and horizontally extending frame 46 including opposed ends 48 and 50.

Figure 6:
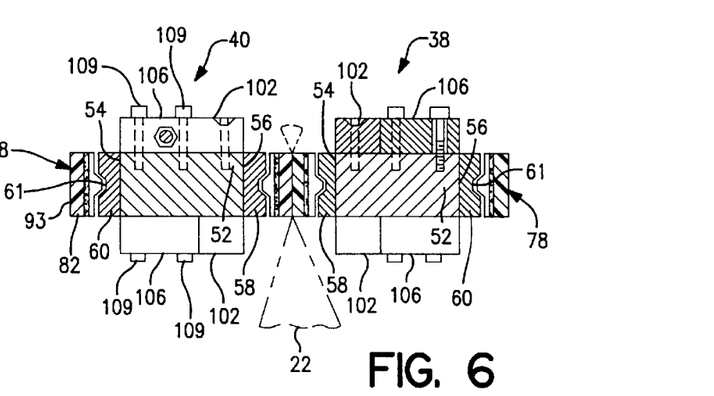
FIG. 6 is an enlarged, partially broken, elevational cross-sectional view taken generally along the plane 6—6 in FIG. 4.
Figure 7:
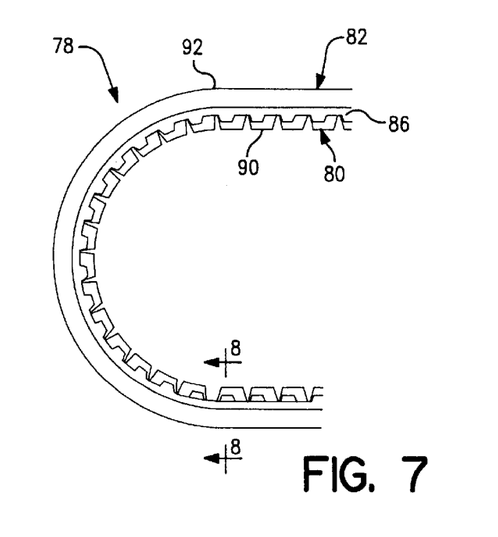
FIG. 7 is a partially broken plan view of the conveyor belt.
Figure 8:
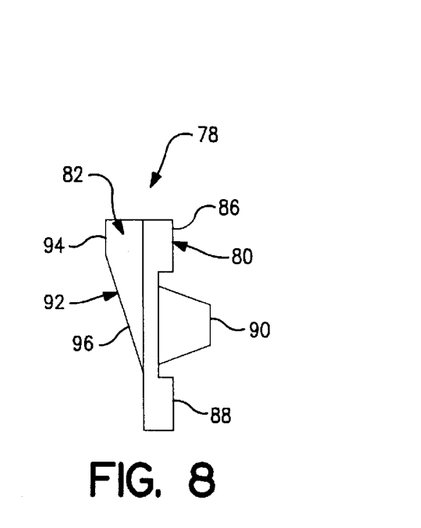
FIG. 8 is an elevational cross-sectional view of the conveyor belt taken generally along the plane 8—8 in FIG. 7.

Referring to FIGS. 2, 3 and 6, the frame 46 of each of the belt assemblies includes an elongate and wide generally flat body 52 having opposed side faces 54 and 56. An elongate slider bed 58 is secured to, and extends the length of, the side face 56 of the body 52. An elongate return bed 60 is secured to, and extends the length of, the side face 54 of the body 52. Each of the beds 58 and 60 includes a centrally positioned and longitudinally extending v-shaped groove 61.

Each of the belt assemblies includes a toothed generally cylindrically shaped drive gear or sprocket 62 (FIGS. 3–5) mounted at the end 48 of the frame 46. A toothed generally cylindrically shaped idler gear or sprocket 64 and a toothed generally cylindrically shaped tension gear or sprocket 66 are mounted at the end 50 of the frame 46 in spaced-apart and generally parallel relationship. Each of the gears 62, 64 and 66 is positioned with respect to the frame 46 such that the axis of rotation thereof is generally normal to the frame 46. Referring to FIG. 5, the drive gear 62 includes two spaced-apart sets of upper and lower circumferentially extending teeth 72 and 74 separated by a circumferentially extending generally v-shaped groove 76. Although not shown, the gears 64 and 66 have the same teeth and groove structure as the drive gear 62.

Referring to FIGS. 1 and 5–8, each of the belt assemblies further includes an endless belt 78 which surrounds the frame 46 and each of the gears 62, 64 and 66. The belt 78 is preferably a timing belt including a parent backing member 80 made of a hard urethane material or the like and a face member 82 which is bonded to the parent member 80 and is made of a soft urethane material or the like material such as foam.

The backing parent member 80 includes an upper and lower series of teeth 86 and 88 separated by a series of generally v-shaped guides 90 therebetween. The face member 82 of the belts 78 on belt assemblies 34 and 36 (FIGS. 5 and 8) includes a countered outer face 92 including an upper generally flat and vertical face portion 94 and a converging face portion 96 depending downwardly from the flat face portion 94. The face member 82 of the belts 78 on belt assemblies 38 and 40 (FIG. 6) includes a flat vertical face 93.

The belt 78 is mounted to the frame 46 on each of the belt assemblies such that its axis of rotation is generally normal to the frame 46 and such that the belt 78 is rotatable in a substantially horizontal plane. The teeth 86 and 88 on the belt 78 interengage with the teeth 72 and 74 respectively on the gears 62, 64 and 66, and the v-shaped guides 90 on the belt 78 track within the v-shaped groove 76 in each of the gears 62, 64 and 66 (FIG. 5) and the v-shaped groove 61 in the slider bed 58 and the return bed 60 of the frame 46 (FIG. 6).

The belt assemblies 34 and 36 of the first conveyor assembly 30 and the belt assemblies 38 and 40 of the second conveyor assembly 32 are respectively positioned with respect to each other such that the belts 78 thereof are positioned opposite and contiguous to each other and generally parallel to the opposed sides of the bags to be transported so as to allow the grasping and release of the bags as is described in detail below.

Referring to FIGS. 1–5, each of the belt assemblies further includes a drive motor 94 in the form of a servo positioning drive or the like which is mounted to, and extends generally perpendicularly outwardly from, the top of the frame 46 and overlying the drive gear 62 for driving the drive gear 62 and the belt 78 interengaged therewith. The drive motor 94 associated with each of the belt assemblies 34 and 38 is mounted to the top of a generally flat horizontal and rectangularly shaped motor mounting plate 96 extending generally perpendicularly outwardly from the frame 46 of belt assemblies 34 and 38 respectively. The plate 96 includes a proximal end 97 which is mounted over the end 48 of the frame 46 of the respective belt assemblies 34 and 38 and overlies the drive gear 62. The drive motor 94 is mounted to and overlies the proximal end 97 of the plate 96.

The drive motor 94 associated with each of the belt assemblies 36 and 40 is mounted on a generally flat horizontal and rectangularly shaped motor mounting plate 98 extending generally parallel to the frame 46 of belt assemblies 36 and 40 respectively. One end 99 of the plate 98 is mounted to and overlies the top of the end 48 of the frame 46 of the respective belt assemblies 36 and 40 while the opposite end 101 of the plate 98 overlies the drive gear 62. The drive motor 94 is mounted to the top of the end 101 of the plate 98.

Each of drive motors 94, two of which are shown in FIG. 5, includes a drive shaft 100 extending from the motor 94 through the respective drive motor mounting plates 96 and 98 into the respective drive gear 62 for driving the drive gear 62 and the belt 78 engaged therewith. The drive motors 94 are electronically geared together such that each of the belts 78 travel in synchronism at the same linear velocity.

Referring to FIGS. 2–3 and 6, the idler gear 64, associated with each of the belt assemblies, is mounted to a generally horizontal and rectangularly shaped idler base plate 102 which is mounted to, and extends outwardly from, the respective ends 48 and 50 of the frame 46. The idler gear base plates 102 respectively associated with the belt assemblies 34 and 36 of first conveyor assembly 30 are mounted to the bottom of the respective frames 46. The idler gear base plates 102 respectively associated with the belt assemblies 38 and 40 of second conveyor assembly 32 are mounted to the top of the respective frames 46.

Referring to FIGS. 2–4 and 6, each of the belt assemblies 34, 36, 38 and 40 also includes a belt tensioner assembly 104 associated with the tension gear 66 for adjusting the tension of the respective belt 78 engaged therewith. Each of the tensioner assemblies 104 includes a generally horizontal and rectangularly shaped tensioner base plate 106 which mounts the respective tension gear 66 to the respective frame 46. The tensioner base plate 106 is positioned on the respective end 48 or 50 of the respective frame 46 adjacent to and abutting the idler base plate 102. One end of the tensioner base plate 106 overlies and is mounted to the respective end 48 or 50 of the respective frame 46. The base plate 106 includes two apertures 108 therein which allow for the sliding movement thereof with respect to the frame 46 about bolts 109 which releasably and slidingly fasten the base plate 106 to the respective frame 46. The tension gear 66 is secured to the opposite end of the tensioner base plate 106.

Each of the tensioner assemblies 104 also includes a tensioner arm 110 in the form of a plate mounted to the frame 46 behind the tensioner base plate 106. Although the details of the arm 110 have been omitted, it is understood that the arm 110 is operably coupled to the tensioner base plate 106 and manually operable to adjust the longitudinal position of the tensioner base plate 106 so as to tighten or loosen the respective belt 78 as desired. The tensioner assemblies 104 associated with belt assemblies 34 and 36 are mounted to the bottom of the respective frame 46 thereof while the tensioner assemblies 104 associated with belt assemblies 38 and 40 are mounted to the top of the respective frame 46 thereof.

Referring to FIG. 1, each of the conveyor assemblies 30 and 32 also includes two spaced-apart reciprocating arm assemblies 112 and 114 positioned adjacent the opposite ends 42 and 44 of the belt assemblies for laterally reciprocating the belt assemblies 36 and 40 away from the stationary belt assemblies 34 and 38 respectively.

Figure 4:
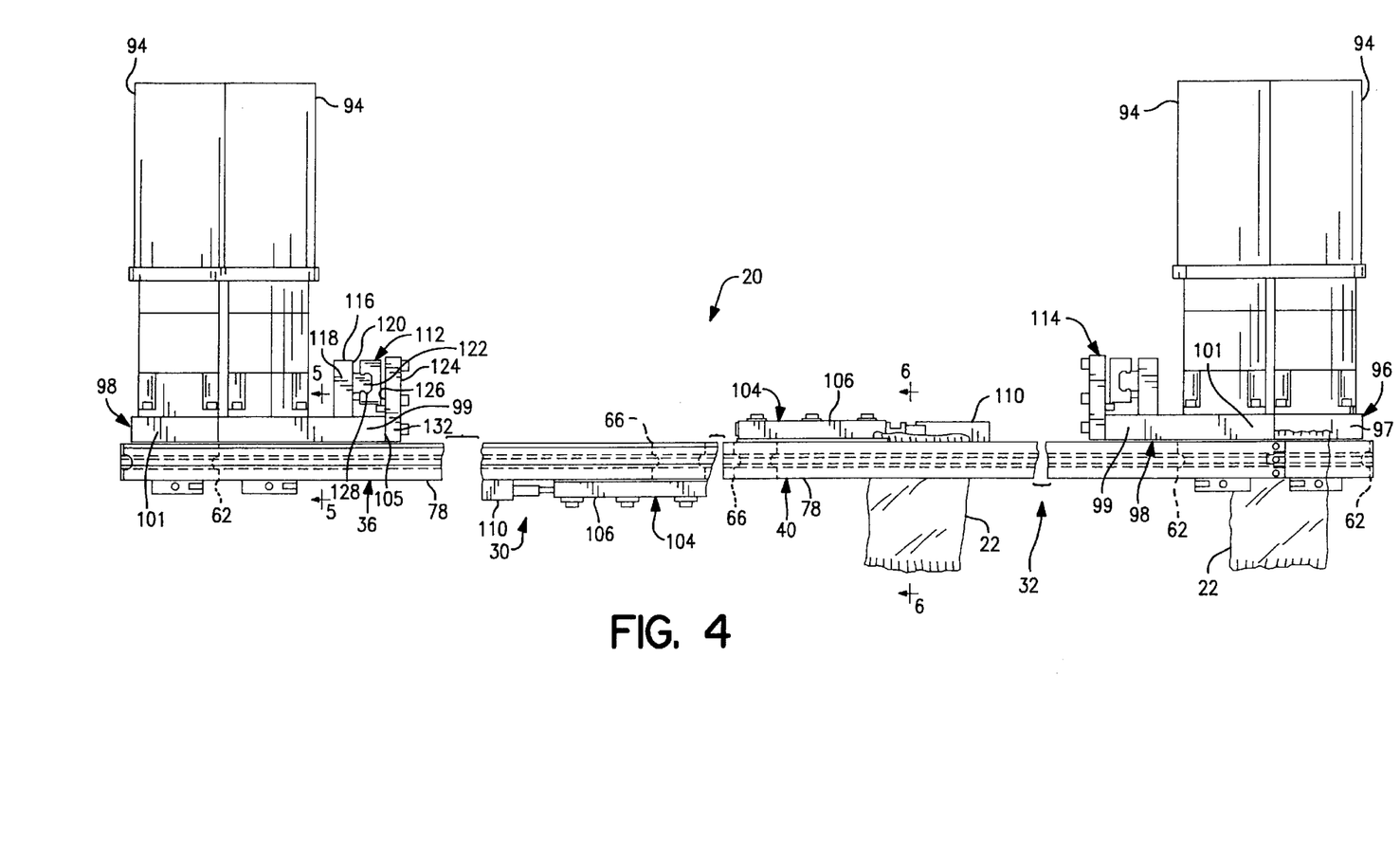
FIG. 4 is an enlarged, partially broken, side elevational view of selected portions of the conveyor apparatus of FIG. 1.
Figure 5:
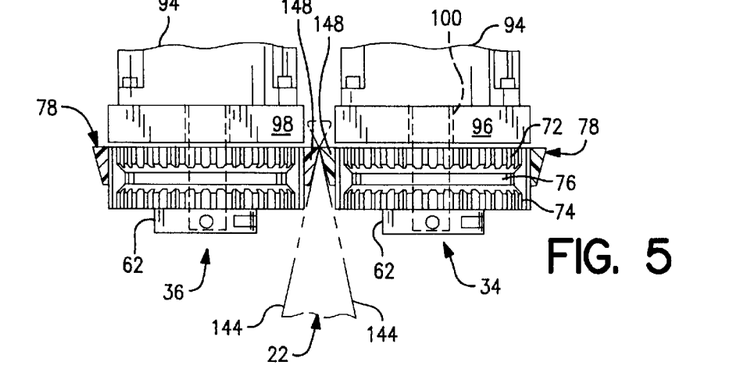
FIG. 5 is an enlarged, partially broken, elevational cross-sectional view taken generally along the plane 5—5 in FIG. 4.

As shown in FIGS. 2–4, the arm assembly 112 associated with the conveyor assembly 30 is mounted adjacent the end 42 of belt assemblies 34 and 36 and includes a bracket 116 in the form of an elongate plate which is mounted and secured to the top of the drive motor mounting plate 96. The bracket 116 includes an inner generally vertical face 120 and extends generally horizontally and perpendicularly to the frame 46 of belt assembly 34. The bracket 116 includes a proximal end 118 overlying and mounted to the top surface of the proximal end 97 of the plate 96. An elongate rail 122 is secured to, and extends generally perpendicularly outwardly from, the vertical side face 120 of the bracket 116.

The arm assembly 112 additionally includes an elongate arm 124 in the form of a generally elongate plate positioned parallel to and adjacent the bracket 116 and abutting the inner longitudinal side edge 103 of the plate 96. The arm 124 includes an inner vertical face 126 having two spaced-apart slide members 128 secured thereto, and extending generally perpendicularly outwardly therefrom, which are mounted to the rail 122 to allow the sliding movement of the arm 124 with respect to the bracket 116. The arm 124 includes a proximal end 132 which abuts and is secured to an inner peripheral vertical end face 105 of the drive motor mounting plate 99 of belt assembly 36.

An arm reciprocating motor 134 which can be pneumatic, hydraulic, or the like, is mounted to a motor mounting bracket 136 extending perpendicularly inwardly from the distal end 117 of the bracket 116 in the direction of the arm 124. The motor 134 includes a shaft 138 extending therefrom and secured to the distal end 125 of the arm 124.

The motor 134 is operable between a first position where the shaft 138 is retracted as shown in FIG. 3 with respect to the arm assembly 112 of conveyor assembly 32 and a second position where the shaft 138 is extended, as shown in FIGS. 1–3 with respect to the arm assembly 112 of conveyor assembly 30, to cause the forward movement of the arm 124 with respect to the rail 122 which, in turn, causes the lateral separation of the belt assemblies 34 and 36.

Referring to FIGS. 1 and 2, the arm assembly 114 of conveyor assembly 30 is spaced from the arm assembly 112 and is mounted adjacent the end 44 of belt assemblies 34 and 36. The arm assembly 114 preferably has the same structural elements as the arm assembly 112 except that it is mounted on an arm assembly mounting plate 140 extending generally perpendicularly to the belt assembly 34 and having a proximal end secured to the frame 46 of belt assembly 34. The arm 124 of arm assembly 114 includes an inner vertical face and a proximal end 132 mounted along the inner vertical face thereof to the peripheral side edge of an arm mounting plate 142 secured to the top of the frame 46 of belt assembly 36.

The arm assemblies 112 and 114 of the second conveyor assembly 32 are spaced-apart from each other and positioned adjacent the ends 42 and 44 of the belt assemblies 38 and 40 respectively. The structural elements of each of the arm assemblies 112 and 114 of conveyor assembly 32 are preferably similar to the structural elements of the arm assemblies 112 and 114 respectively of the first conveyor assembly 30.

In accordance with the present invention, substantially flat bags 22 are fed from a supply (not shown). Referring to FIGS. 5 and 6, each of the bags 22 includes opposed sides 144 defining an interior and opposed side top peripheral edges 148.

Although FIG. 1 depicts the belt assemblies 34 and 36 laterally displaced from each other, it is understood that the bags 22 are conveyed generally horizontally and in a generally upright configuration by the first conveyor assembly 30 into and through the first work station 26 when the belt assemblies 34 and 36 are disposed in a generally abutting and coacting relationship as shown in FIG. 5 with the belts 78 thereof in contiguous relationship. In particular, the side peripheral top edges 148 of the bags 22 are grasped by the belts 78 of belt assemblies 34 and 36 when the belt assemblies 34 and 36 are positioned in a generally abutting relationship.

The soft material composition of the belt face member 82 of the belts 78 on belt assemblies 34 and 36 allows the opposing contiguous belts 78 to firmly grip the bags 22. The countered outer face 92 of the face member 82 assures that the sides 144 of the bags 22 are not restricted by the belt 78 during transport.

Where the first station 26 is a bag filling station or the like, the movement of the bags 22 must be arrested so that the bags 22 can be filled. The movement of the bags 22 is arrested by energizing the drive motors 134 associated with each of the reciprocating arm assemblies 112 and 114 of conveyor assembly 30 to cause the extension of the respective shafts 138 thereon which, in turn, causes the extension and sliding of the respective arms 124 along the respective rails 122 which, in turn, causes the lateral displacement of the belt assembly 32 from the stationary belt assembly 30 as shown in FIGS. 1–3 to release the bags 22 at the first work station 26.

After the bags 22 have been filled, the respective drive motors 134 of arm assemblies 112 and 114 are reenergized to retract the respective shafts 138 thereon which causes the retraction of the respective arms 124 along the respective rails 122 which, in turn, returns the laterally reciprocable belt assembly 32 into its adjacent and generally abutting relationship with the belt assembly 30 as shown in FIG. 5 so as to cause the belts 78 to regrasp the bags 22 for conveyance in the direction of the belt rotation through the remainder of the first station 26.

At the end of the first work station 26, the bags 22 are transferred from the first conveyor assembly 30 to the belt assemblies 38 and 40 of the second conveyor assembly 32 for moving the bags 22 into and through the second work station 28. The staggered relationship between the respective belt assemblies provides for a continuous contiguous relationship between the belts of successive conveyor assemblies so that the bags 22 remain in contact with one or more of the contiguous conveyor belts 78 as the bags 22 are transferred from the conveyor assembly 30 to the conveyor assembly 32. As shown in FIGS. 1 and 6, the belt assemblies 38 and 40 are positioned in an adjacent and generally abutting relationship such that the bags 22 are grasped by the opposed contiguous belts 78 of the belt assemblies 38 and 40 and conveyed through the second work station 28.

The soft material of the flat face member 82 of the belts 78 of belt assemblies 38 and 40 allows for a firm grasp of an extended portion of the side peripheral top edges 148 of the bags 22.

The arm assemblies 112 and 114 associated with the conveyor assembly 32 are operable in a manner substantially similar to the arm assemblies 112 and 114 associated with conveyor assembly 30 to release the bags 22 along the second station 28 where the second station 28 is a bag sealing station or the like where it is necessary that the bags 22 be arrested to seal the same. After the bags 22 have been sealed, the arm assemblies are reenergized to regrasp the bags 22 and the filled and sealed bags 22 are moved out of the second station 28 and the packaging machine.

The conveyor apparatus 20 described above including two sets of opposed belt assemblies is suitable for use in a machine including two work stations. It is understood, however, that the number, configuration and arrangement of the belt assemblies of the present invention may be modified for use in a machine including more than two work stations. Three conveyor apparatus embodiments suitable for use in a packaging machine including more than two work stations are shown in simplified form in FIGS. 9–11.

Figure 9:
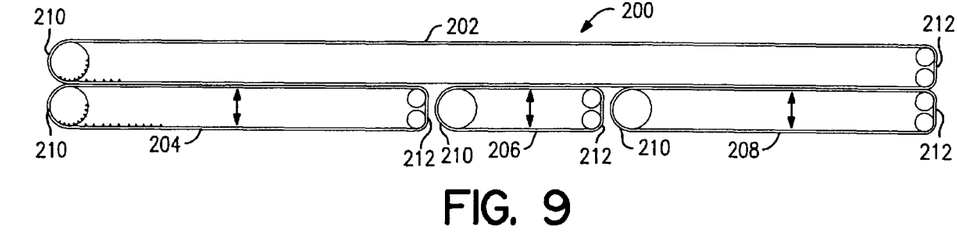
FIG. 9 is a simplified plan view of another embodiment of the conveyor apparatus of the present invention.

FIG. 9 shows a conveyor apparatus 200 including an elongate stationary belt assembly 202 opposed from and adjacent to three co-linearly aligned laterally reciprocable belt assemblies 204, 206 and 208. Each of the belt assemblies includes opposed ends 210 and 212. The end 212 of belt assembly 204 is juxtaposed to the end 210 of belt assembly 206 and the end 212 of belt assembly 206 is juxtaposed to the end 210 of belt assembly 208.

Although not shown in FIG. 9, each of the belt assemblies of conveyor apparatus 200 is substantially similar in structure to the belt assemblies of the conveyor apparatus 20. The conveyor apparatus 200 is particularly suitably for use in a packaging machine where bags are moved into and through three separate packaging stations. Each of the belt assemblies 204, 206 and 208 is independently laterally reciprocable in the same manner as belt assemblies 38 and 40 of conveyor apparatus 20 to release the bags along any of the three packaging stations so that the bags can be filled, sealed or otherwise operated upon.

Figure 10:
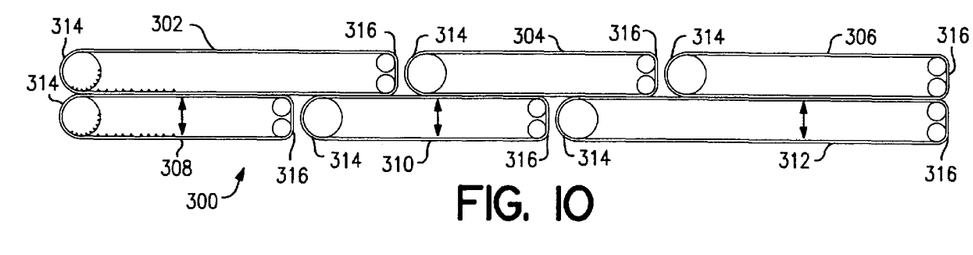
FIG. 10 is a simplified plan view of yet another embodiment of the conveyor apparatus of the present invention.

FIG. 10 shows a conveyor apparatus 300 including a first group of three co-linearly aligned stationary belt assemblies 302, 304 and 306 and a second group of three co-linearly aligned laterally reciprocable belt assemblies 308, 310 and 312 opposed to the belt assemblies 302, 304 and 306. Each of the belt assemblies includes opposed ends 314 and 316. The belt assemblies 302, 304 and 306 are co-linearly aligned such that the end 316 of belt assembly 302 is juxtaposed to the end 314 of belt assembly 304 and the end 316 of belt assembly 304 is juxtaposed to the end 314 of belt assembly 306. The belt assemblies 308, 310 and 312 are co-linearly aligned such that the end 316 of belt assembly 308 is juxtaposed to the end 314 of belt assembly 310 and the end 316 of belt assembly 310 is juxtaposed to the end 314 of belt assembly 312. The belt assemblies are arranged in a staggered or overlapping relationship where the juxtaposed ends of the belt assembly 308 and 310 overlie the belt assembly 302 and the juxtaposed ends of the belt assemblies 310 and 312 overlie the belt assembly 304. Each of the belt assemblies is substantially similar in structure to the belt assemblies of conveyor apparatus 20.

The conveyor apparatus 300, like the conveyor apparatus 200, is also suitable for use in a packaging machine where bags are moved into and through three separate packaging stations. Each of the belt assemblies 308, 310 and 312 is independently laterally reciprocable from the stationary belt assemblies 302, 304 and 306 to release bags at each of the packaging stations.

Figure 11:
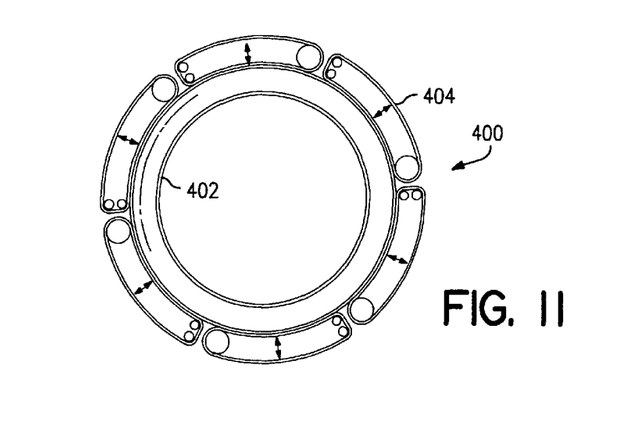
FIG. 11 is a simplified plan view of still another embodiment of the conveyor apparatus of the present invention.

FIG. 11 shows a conveyor apparatus 400 including a central generally circular stationary belt assembly 402 and a plurality of peripheral generally curvilinear belt assemblies 404 opposite and surrounding the circular belt assembly 402. Each of the curvilinear belt assemblies 404 includes juxtaposed ends. The conveyor assembly 400 is suitable for use in a packaging machine which includes six packaging stations. Each of the belt assemblies 404 is independently laterally and radially outwardly reciprocable to allow the release of bags at selected packaging stations.

The conveyor apparatus of the present invention includes a plurality of opposed and reciprocable belt assemblies which advantageously allow the operations at the various packaging stations such as filling and sealing of the bags to occur independently of one another. For example, and referring to the conveyor apparatus 20 of FIG. 1 where the first packaging station 26 is a bag filling station and the second packaging station 28 is a bag sealing station and where filling the bags requires more time than sealing the bags, the bags can advantageously be conveyed out of the second sealing station 28 and out of the packaging machine while the bags 22 are still being filled in the first station 26

As a result, and unlike present conveyor assemblies, the packaging machine can cycle faster than the time required to affect the slowest operation, thus increasing the overall production rate and efficiency of the packaging machine.

From the foregoing, it will be observed that numerous modifications and variations can be effected with departing from the true spirit and scope of the novel concepts of the present invention. It will be appreciated that the present disclosure is intended as an exemplification of the invention, and is not intended to limit the invention to the specific embodiments illustrated. The disclosure is intended to cover by the appended claims all such modifications as fall within the scope of the claims.

We claim:

1. An apparatus for conveying bags through a machine including a plurality of work stations, the apparatus comprising:

(a) a plurality of first co-linearly aligned belt assemblies having juxtaposed ends, each of said first belt assemblies being disposed along a bag transport path extending through said work stations, each of said first belt assemblies including a generally flat horizontal frame and a belt surrounding said frame having an axis of rotation generally normal to said frame;

(b) a plurality of second co-linearly aligned belt assemblies having juxtaposed ends, said second belt assemblies being disposed opposite and parallel to said first belt assemblies respectively, each of said second belt assemblies including a generally flat horizontal frame and a belt surrounding said frame having an axis of rotation generally normal to said frame, said belts of said first and second belt assemblies respectively being rotatable in synchronism and positioned opposite and contiguous to each other for grasping said bags and conveying said bags in a generally upright orientation along said bag transport path through said work stations; and (c) means operably coupled to said frame of each of said first and second belt assemblies for independently laterally reciprocating said second belt assemblies away from said first belt assemblies to release the bags at selected work stations, said means including a reciprocating arm having one end connected to said frame of said respective second belt assemblies and an opposite end operably coupled to an arm reciprocating motor, the arm being reciprocable between a retracted position wherein aid belt of each of said respective second belt assemblies is positioned generally contiguous to said belt of each of said respective first belt assemblies for respectively grasping said bags and an extended position wherein said respective second belt assemblies are separated from said respective first belt assemblies to release said bags.

2. An apparatus for conveying bags along a bag transport path including a plurality of work stations, the apparatus comprising:

(a) a plurality of conveyor assemblies extending through said plurality of work stations respectively, each of said conveyor assemblies including first and second opposed and parallel belt assemblies, the first and second belt assemblies of each of said conveyor assemblies being respectively co-linearly juxtaposed to each other in an overlapping relationship;

(b) each of said first and second belt assemblies of each of said conveyor assemblies including a generally horizontal frame, a drive gear at one end of the frame and first and second spaced apart idler gears at the other end of the frame and a belt surrounding said frame and engaging said gears for rotation about an axis generally normal to said frame, said belt including a backing member engaging said gears and a generally soft face member bonded to said backing member, the belts of said first and second belt assemblies being positioned opposite and contiguous to each other for grasping said bags and conveying said bags in a generally upright orientation through said bag work stations;

(c) a drive motor mounted to said frame of each of said first and second belt assemblies and coupled to said drive gear of each of said first and second belt assemblies for driving said respective drive gear and said respective belts engaged therewith in synchronism;

(d) first and second reciprocating arm assemblies associated with each of said conveyor assemblies, each of said arm assemblies including a rail extending generally perpendicularly to said respective conveyor assembly and having a proximal end coupled to a respective first belt assembly, each of the arm assemblies further including an arm parallel to and slidably mounted to said rail, said arm including a proximal end coupled to a respective second belt assembly, and an arm reciprocating motor mounted to the distal end of said arm assembly and operably coupled to the distal end of said arm for reciprocating said second assembly of each of said conveyor assemblies between a retracted bag grasping position and an extended bag release position; and (e) a tensioner assembly associated with each of said first and second belt assemblies including a tensioner plate having one end slidingly mounted to one end of said respective frame, one of said idler gears being mounted to the other end of said tensioner plate for adjusting the tension of said belt on said respective frame.

3. The apparatus of claim 2 wherein said drive motor on each of said first belt assemblies and one of said arm assemblies is mounted on a plate extending generally perpendicularly to said respective first belt assembly and having a proximal end mounted to said frame of said respective first belt assembly.

4. The apparatus of claim 2 wherein each of said arm assemblies is mounted on a generally flat horizontal plate extending generally perpendicularly to said respective conveyor assembly and having a proximal end mounted to the top of said frame of said respective first belt assembly.

5. An apparatus for conveying substantially flat bags past plural stations which apparatus comprises:

(a) a stationary endless belt of circular configuration and rotatable in a substantially horizontal plane; and (b) a plurality of laterally reciprocable endless belts surrounding said stationary endless belt about the periphery thereof, said reciprocable endless belts being normally contiguous to said stationary endless belt and rotatable in synchronism therewith;

said stationary endless belt and said reciprocable endless belts being adapted for grasping the flat bags therebetween, and for conveying the grasped flat bags in the direction of belt rotation, when contiguous to one another, and releasing the grasped bags when the reciprocable endless belts are laterally displaced from the stationary endless belt.

6. An apparatus for conveying bags through a machine including a plurality of work stations, the apparatus comprising:

(a) a plurality of first-co-linearly aligned belt assemblies having juxtaposed ends, each of said first belt assemblies being disposed along a bag transport path extending through said work stations, each of said first belt assemblies including a generally flat horizontal frame and a belt surrounding said frame having an axis of rotation generally normal to said frame, (b) a plurality of second co-linearly aligned belt assemblies having juxtaposed ends, said second belt assemblies being disposed opposite and parallel to said first belt assemblies respectively, each of said second belt assemblies including a generally flat horizontal frame and a belt surrounding said frame having an axis of rotation generally normal to said frame, said belts of said first and second belt assemblies respectively being rotatable in synchronism and positioned opposite and contiguous to each other for grasping said bags and conveying said bags in a generally upright orientation along said bag transport path through said work stations; and (c) means operably coupled to said frame of each of said first and second belt assemblies for independently laterally reciprocating said second belt assemblies away from said first belt assemblies to release the bags at selected work stations, said means including an arm assembly associated with each of said first and second belt assemblies, each of said arm assemblies including an elongate rail and an elongate arm extending generally perpendicularly to said frame of said respective first and second belt assemblies, the arm including one end secured to said respective frame of said second belt assemblies and an opposite end operably coupled to an arm reciprocating motor, said arm being slidable on said rail between a retracted position wherein said belt of said respective second belt assemblies is positioned generally contiguous with said belt of said respective first belt assemblies for grasping said bags and an extended position wherein said respective second belt assemblies are separated from said respective first belt assemblies to release the bags.

7. The apparatus of claim 6 wherein each of said arm assemblies is mounted on a generally flat plate extending generally perpendicularly to said frame of said first belt assemblies.

8. The apparatus of claim 1 wherein each of said first and second belt assemblies includes a drive gear and an idler gear at opposite ends respectively of said frame, each of said gears having an axis of rotation generally normal to said frame, said belt on each of said first and second belt assemblies surrounding said frame and engaging said gears respectively, each of said first and second belt assemblies including a drive motor mounted to the top of said respective frame and operably coupled to said respective drive gear for driving said drive gear and said belt engaging said drive gear.

9. The apparatus of claim 1 wherein each of said first and second belt assemblies includes a gear at opposite ends of said respective frame, said belt surrounding said frame and engaging said gears for rotation about an axis generally normal to said frame, the apparatus further comprising a tensioner assembly secured to the frame of each of said first and second belt assemblies and coupled to one of said gears for adjusting the tension of said belt.

10. The apparatus of claim 9 wherein said tensioner assembly includes a tensioner plate having opposite ends, said tensioner plate being slidingly mounted at one end to said frame and said gear being coupled to said opposite end of said tensioner plate, said tensioner assembly further including a tensioner arm mounted to said frame and operably coupled to said tensioner plate for sliding said tensioner plate on said frame.

11. The apparatus of claim 1 wherein each of said first and second belt assemblies includes a gear at opposite ends of said frame, said belt on each of said first and second belt assemblies including a backing member engaging said gears and said frame and a face member bonded to said backing member, said face member grasping said bags.

12. The apparatus of claim 11 wherein said face member has a countered outer surface.

13. The apparatus of claim 11 wherein said face member includes an outer surface having a generally flat top face portion and a bottom converging face portion.

14. The apparatus of claim 11 wherein said backing member is made of a generally hard material and said face member is made of a generally soft material.

* * * * *